(12) United States Patent
McIsaac

(10) Patent No.: US 7,823,899 B2
(45) Date of Patent: Nov. 2, 2010

(54) BICYCLE PROPULSION ASSEMBLY HAVING ELONGATE MEMBERS

(76) Inventor: Gerald McIsaac, Mail Bag 5555, Mackenzie, BC (CA) V0J 2C0

( * ) Notice: Subject to any disclaimer, the term of this patent is extended or adjusted under 35 U.S.C. 154(b) by 205 days.

(21) Appl. No.: 12/107,713

(22) Filed: Apr. 22, 2008

(65) Prior Publication Data

US 2009/0261552 A1 Oct. 22, 2009

(51) Int. Cl.
*B62M 1/04* (2006.01)
(52) U.S. Cl. ..................................................... 280/255
(58) Field of Classification Search .................. 280/252, 280/253, 255
See application file for complete search history.

(56) References Cited

U.S. PATENT DOCUMENTS

| 1,427,589 | A | | 8/1922 | Greenison | |
|---|---|---|---|---|---|
| 1,739,628 | A | | 12/1929 | Bemont | |
| 3,375,023 | A | | 3/1968 | Cox | |
| 3,633,938 | A | | 1/1972 | Solomon et al. | |
| 3,661,404 | A | | 5/1972 | Bossaer | |
| 3,759,543 | A | | 9/1973 | Clark | |
| 3,881,747 | A | * | 5/1975 | Abbott | 280/255 |
| 3,984,129 | A | | 10/1976 | Hege | |
| 4,666,173 | A | | 5/1987 | Graham | |
| 5,335,927 | A | | 8/1994 | Islas | |
| 5,390,773 | A | * | 2/1995 | Proia | 192/45 |
| 5,785,337 | A | | 7/1998 | Ming | |
| 5,871,221 | A | * | 2/1999 | Min et al. | 280/253 |
| 5,988,662 | A | * | 11/1999 | Staehlin | 280/253 |
| 6,209,900 | B1 | | 4/2001 | Yoshizawa | |
| 6,595,535 | B2 | * | 7/2003 | Farina | 280/255 |
| 6,964,424 | B2 | * | 11/2005 | Wielkopolski | 280/252 |

FOREIGN PATENT DOCUMENTS

| CA | 2120535 | 10/1995 |
|---|---|---|
| CA | 2296166 | 7/2001 |

* cited by examiner

*Primary Examiner*—Kevin Hurley
(74) *Attorney, Agent, or Firm*—Cameron IP

(57) ABSTRACT

The present invention provides a propulsion assembly for a bicycle. The propulsion assembly includes a support member that at least extends from the bicycle frame to a distal end spaced-apart from the rear wheel. The assembly includes a first drive mechanism rotatably mounted on the frame and axially connected to the rear wheel for transmitting motion thereto. A second drive mechanism is rotatably mounted at the distal end of the support member and coupled with the first drive mechanism. Ratchet mechanisms axially extend from the second drive mechanism and connect to a pair of elongate members having pedals. The pedals are movable from an upper position to a lower position for transmitting one-way rotational power to the second drive mechanism. There is a means for selectively returning the pair of elongate members from the lower position to the upper position.

2 Claims, 4 Drawing Sheets

BICYCLE PROPULSION ASSEMBLY HAVING ELONGATE MEMBERS

BACKGROUND OF THE INVENTION

1. Field of the Invention

The present invention relates to a propulsion assembly having elongate members. It relates to a propulsion assembly having elongate members in particular as used in bicycles.

2. Description of the Related Art

The idea of using reciprocating elongate members for propelling a bicycle is known. For example, U.S. Pat. No. 5,335,927 to Islas shows a drive mechanism for a bicycle that employs elongate members in the form of foot levers mounted on the frame. The foot levers are mounted close to rear sprocket and are connected to a rotary drive mechanism which, in turn, is connected to the rear wheel.

While Islas provides foot levers, their purpose is defeated: Islas effectively splits the levers so that only a portion of each lever is used for the rider to generate torque. The portions of levers used are not much longer than that of the cranks on a conventional bicycle. As a result, Islas fails to enable the generation of noticeably more torque than that of the conventional bicycle. Also, Islas has a number of exposed parts and cables which may be prone to entanglement and failure.

Another example is U.S. Pat. No. 3,881,747 to Abbott which shows a bicycle foot pedal that is movable through an adjustable linkage of elongate members. The elongate members are in the form of levers for transmitting one-way rotational power to an elevated drive sprocket. The assembly is configured to enable a bicycle rider to vary the path of the pedal to simulate running, walking, or other desirable movement. However, Abbott also splits the levers and as a result the propulsion system provides a diminished leverage or torque. Abbott also requires for its propulsion system a bicycle that is completely re-modified.

BRIEF SUMMARY OF INVENTION

An object of the present invention is to provide an improved propulsion assembly for a bicycle that overcomes the above disadvantages.

More particularly, the present invention provides a propulsion assembly with elongate members shaped and positioned on the bicycle frame for providing maximized torque in propelling the bicycle forward, with an assembly that requires fewer and more compact and hence more robust parts and that can be retrofitted onto a conventional bicycle According to one aspect of the invention, there is provided a propulsion assembly for a bicycle. The bicycle has a frame with a top and a bottom opposite the top. The bicycle has a front with a front wheel rotatably connected thereto at the bottom, and a rear opposite the front with a rear wheel rotatably connected thereto at the bottom. The assembly includes a support member extending from the frame to a distal end of the support member. The distal end is spaced-apart from the rear wheel. The assembly includes a first drive mechanism rotatably mounted on the frame and axially connected to the rear wheel for transmitting motion thereto. A second drive mechanism is rotatably mounted at the distal end of the support member. The second drive mechanism is spaced-apart from the seat post and has an axis of rotation. The assembly includes a coupling member for coupling the first drive mechanism to the second drive mechanism. A pair of ratchet mechanisms are operatively connected to the second drive mechanism and axially align with the axis of rotation of the second drive mechanism. The second drive mechanism is between the pair of ratchet mechanisms. A pair of elongate members are operatively connected to and extend from the second drive mechanism through the pair of ratchet mechanisms in planes parallel with the frame to a pair of pedals positioned between the rear wheel and the front wheel of the bicycle. The pair of pedals is movable in the planes from an upper position to a lower position for transmitting one-way rotational power to the second drive mechanism. The assembly includes means for selectively returning the pair of elongate members from the lower position to the upper position.

According to another aspect of the invention, there is provided a propulsion assembly for a bicycle having a frame with a top having a seat post with seat extending therefrom, and a bottom opposite the top. The bicycle has a front with a front wheel rotatably connected thereto at the bottom, and a rear opposite the front with a rear wheel rotatably connected thereto at the bottom. The assembly includes a support member extending from the frame, away from the seat post and towards the rear of the frame, to a distal end of the support member. The distal end is spaced-apart from the rear wheel and includes a support housing. A rear axle is axially connected to the rear wheel and rotatably mounted on the frame. A rear sprocket radially extends from the rear axle at one end of the rear axle. The rear sprocket is axially connected to the rear wheel for transmitting motion thereto. The assembly includes a drive axle is rotatably received in part within the support housing. A rotatable drive sprocket radially extends from the drive axle at one end of the drive axle. The drive sprocket is spaced-apart from the seat post. The drive sprocket having an axis of rotation. An endless chain is operatively connected the rear sprocket to the drive sprocket. The assembly includes a pair of ratchets connected by opposed ends of the drive axle and axially aligning with the axis of rotation of the drive sprocket. The drive sprocket is between the pair of ratchets. The assembly includes a pair of rigid elongate members operatively connected to the drive sprocket and extending from the pair of ratchets in planes parallel with the frame to a pair of pedals positioned between the rear wheel and the front wheel of the bicycle. The pair of pedals are movable in the planes from an upper position to a lower position for transmitting one-way rotational power to the drive sprocket. The assembly includes means for selectively returning the pair of rigid elongate members from the lower position to the upper position.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
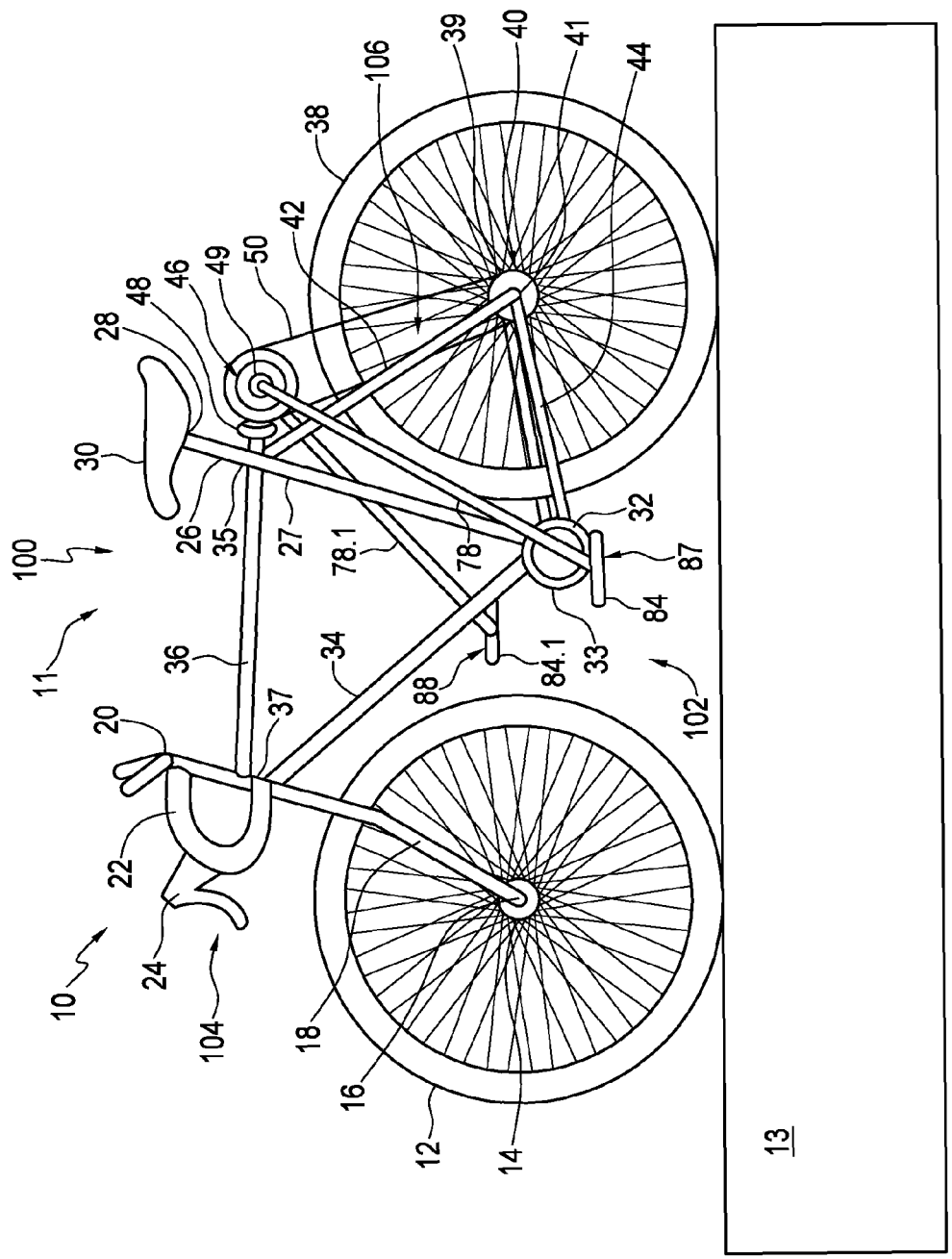
FIG. 1 is a side elevation view of a bicycle with a propulsion assembly according to one embodiment of the invention.

Referring to the drawings and first to FIG. 1, there is provided a bicycle 10. The bicycle has a frame 11 with a top 100, bottom 102, front 104 and rear 106. The bicycle has a front wheel 12 at the front of the frame towards the bottom connected to a front axle 14. The front axle 14 is rotatably connected to the frame 11 at first end 16 of a front fork 18. The front fork 18 vertically extends upwards from the perspective of FIG. 1 to a second end 20. A handle bar 22 extends from the second end 20. The handle bar 22 has brakes levers 24 for braking the bicycle.

The bicycle 10 has a seat tube 27 that substantially extends vertically from an upper end 28 to a lower end 32 at the bottom of the frame. The lower end 32 in this example comprises a chain wheel, though this is not required. A crossbar 36 extends substantially horizontally from the front fork 18 at point 37 to the seat tube 27 at junction 35 in between the upper end 28 and lower end 32. The seat tube 27 includes a seat post 26 that extends from the junction 35 to upper end 28. The seat post 26 supports a seat 30. A down tub 34 extends diagonally from the front fork 18 by point 37 to the lower end 32 of the seat tube 27.

The bicycle 10 has a rear wheel 38 at the rear. The rear wheel 38 is operatively coupled to a first drive mechanism 40. The first drive mechanism 40 in this example comprises a rear axle 41 with a rear sprocket 39 radially extending outwards therefrom on one end of the rear axle 41. The first drive mechanism 40 is rotatably mounted on the frame through the rear axle 41. The frame includes a pair of spaced-apart seat stays 42 that diagonally extend on either side of the rear wheel from the rear axle 41 to the junction 35. The frame includes a pair of spaced-apart chain stays 44 that extend on either side of the rear wheel from the rear axle 41 along the bottom of the frame to the lower end 32 of the seat tube 27.

The above until this point describes a conventional bicycle that rests on ground 13.

Referring now to the propulsion assembly according to one embodiment of the invention, a support member 48 extends at least towards the rear of the frame to a distal end 49. The distal end 49 of the support member is spaced-apart from the seat post 26 and spaced-apart from the rear wheel 38. In this example, the support member 48 extends horizontally rearward from the junction 35, from the perspective of FIG. 1.

Figure 2:
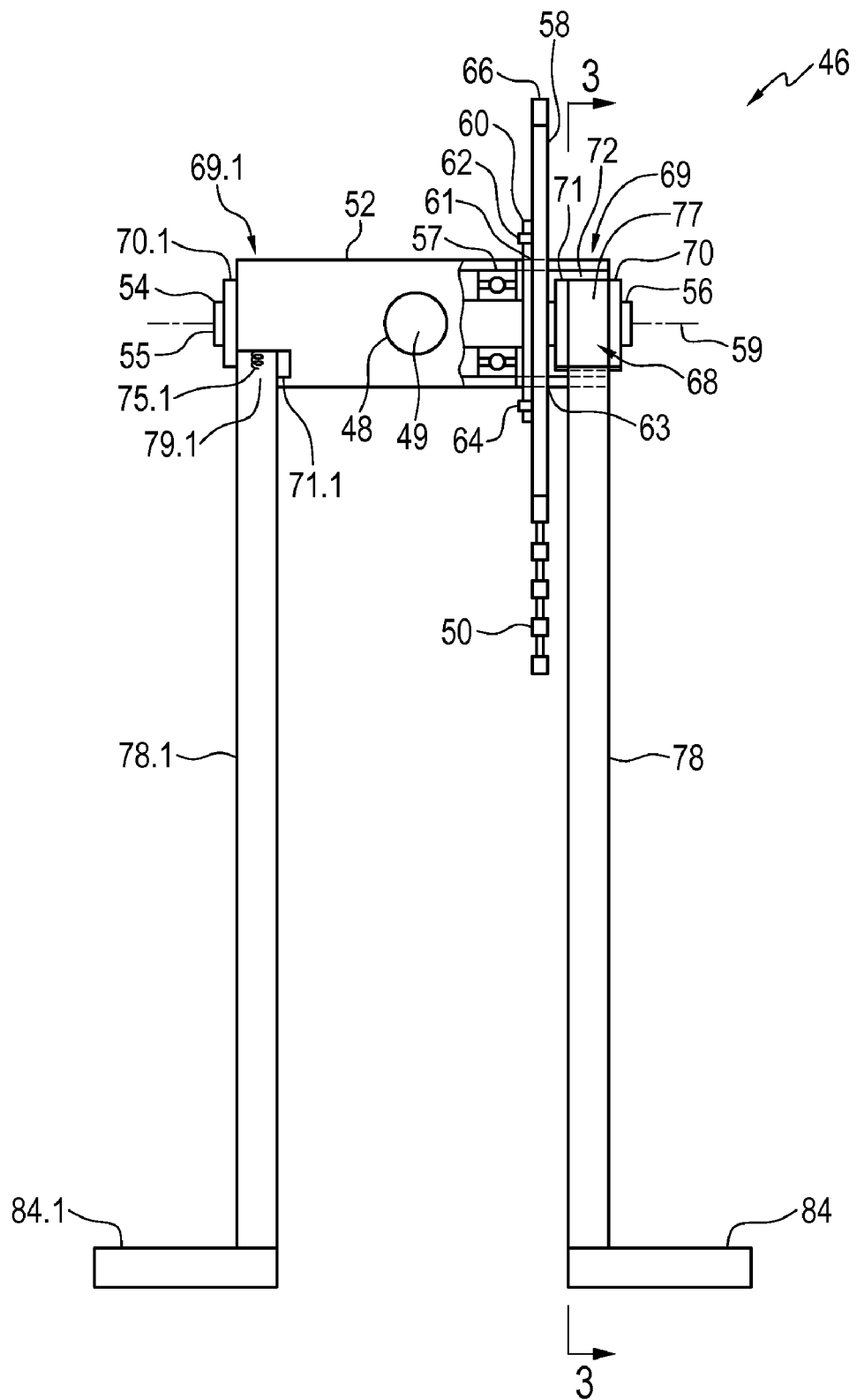
FIG. 2 is a front, partially broken away, elevation view showing part of the propulsion assembly of FIG. 1.

Referring to FIG. 2, the distal end 49 of the support member 48 has a support housing 52. The support housing 52 is stationary with respect to the frame. The support housing 52 is shown partially broken away to the right from the perspective of FIG. 2.

A second drive mechanism 46 is rotatably connected to the stationary support housing 52. The second drive mechanism 46 includes a drive axle 56 rotatably received within the support housing 52 through the bearings 57 partially revealed. The drive axle 56 has opposite ends 55 and 56. The drive axle 56 is rotatable about an axis of rotation 59. The second drive mechanism 46, in this example, includes a mounting plate 60 connected to and radially extending outwards from the drive axle 56. The second drive mechanism 46 also includes, in this example, a drive sprocket 58. The drive sprocket 58 is coupled to and radially extends outwards from the drive axle 56 through the mounting plate 60 via bolts 62 and 64. The drive sprocket 58 and mounting plate 60 have apertures 61 and 63 enabling the drive sprocket and mounting plate to rotate around the support housing 52. The drive sprocket 58 has teeth 66 for engaging a coupling means which in this example is an endless chain 50.

The support housing 52 further includes a pair of stationary ratchet housings 69 and 69.1 located near opposite ends 55 and 56 of the drive axle 54, respectively. Each of the ratchet housings and the components therein is substantially the same with one of the pair of ratchet housings 69 being a mirror-image of the other. Accordingly, only one of the pair of ratchet housings 69 is described in detail herein with the understanding that the other ratchet housing 69.1 has a similar structure and function. For the ratchet housing 69.1 like parts have been given like reference numerals as the first ratchet housing with the additional designation "0.1".

Referring to FIG. 2, the ratchet housing 69 is shown partially broken away in FIG. 2 to reveal its interior 72. A ratchet mechanism 68 is disposed within the interior 72. The ratchet mechanism 68 includes a hollow outer portion 77 axially mounted on the drive axle 54 through bearings 70 and 71. The ratchet mechanism includes an inner portion, which in this example is a ratchet gear 73, disposed within the outer portion 77, that is mounted on and co-axial with the drive axle 54. A pawl 74 is pivotally mounted on the outer portion 77 and is positioned for engaging the ratchet gear 73. The pawl 74 is positioned to allow rotational motion of the ratchet gear 73 and hence the drive axle in substantially one direction only. From the perspective of FIG. 3, when the outer portion 77 is rotated in the counter clockwise direction as indicated by the arrow of numeral 76, the ratchet mechanism is configured for the pawl 74 to forceably engage the ratchet gear 73. When the outer portion 77 is rotated in the clockwise direction, the ratchet mechanism is configured to allow the pawl 74 to freely pass over and not engage the ratchet gear 74. As a result, the outer portion 77 can spin freely in the clockwise direction. Ratchet mechanisms are known in the art and therefore will not be described in further detail herein. A ratchet mechanism 68.1 is disposed within ratchet housing 69.1 on the other side of the bicycle, and has substantially the same parts and operates in substantially the same manner and therefore will not be described.

A first elongate member 78 and a second elongate member 78.1 extend from the outer portions 77 and 77.1 of the first ratchet mechanism 68 and the second ratchet mechanism 68.1, respectively. The elongate members 78 and 78.1 are rigid and in this example are made of metal. Each of the elongate members is substantially the same with the first elongate member 78 being a mirror-image of the second elongate member 78.1. Accordingly, only the first elongate member 78 is described in detail herein with the understanding that the second elongate member 78.1 has a similar structure and function. For the second elongate member like parts have been given like reference numerals as the first elongate member with the additional designation "0.1".

The first elongate member 78 has a mounting end 80 that connects with the outer portion 77. The elongate member 78 is thus mounted high on and to the rear of the frame, from the perspective of FIGS. 2 and 3. The elongate member 78 is substantially longer than the cranks are a conventional bicycle. For example, the elongate members can be three or four times as long as the cranks of a conventional bicycle, resulting in a corresponding increase in power.

A first resilient member, which in this example is in the form a coil spring 75, is disposed within the interior 72 of the ratchet housing 69. The coil spring 75 is connected on one end to the ratchet housing 69 and to the elongate member 78 on the other end. The coil spring is positioned such that it does not interfere with the pawl 74. The coil spring 75 is in tension when the elongate member 78 is in the lower position 87. When the coil spring 75 is tensioned, it is disposed to urge the outer portion 77 to move in a clockwise direction. The ratchet housing 69 has a slot 79 for the elongate member 78 to pass through when the outer portion 77 is moved in the clockwise direction. The coil spring 75 returns to a more elongated form for elevating the elongate member back to the upper position 88. In like manner, a second resilient member in the form a coil spring 75.1 connects to the support housing 69.1, as partially illustrated in FIG. 2. The elongate members are therefore moveable from the lower position 87 as shown for the first elongate member 78, where the coil spring 75 is more tensioned, to an upper position 88 as shown for the second elongate member 78.1 where the coil spring 75.1 is less tensioned. In one example, an elongate member in the upper position 88 is separated by 45 degrees from an elongate member in the lower position 87.

The first elongate member 78 has a pedal end 82 that connects to a pedal 84. The pedal 84 is rotatably connected to the first elongate member 78 via shaft 85 and bearings 86 shown in FIG. 3. This connection is known in the art and therefore will not be described in further detail. In like manner, a pedal 84.1 is rotatably connected to the second elongate member 78.1

Figure 3:
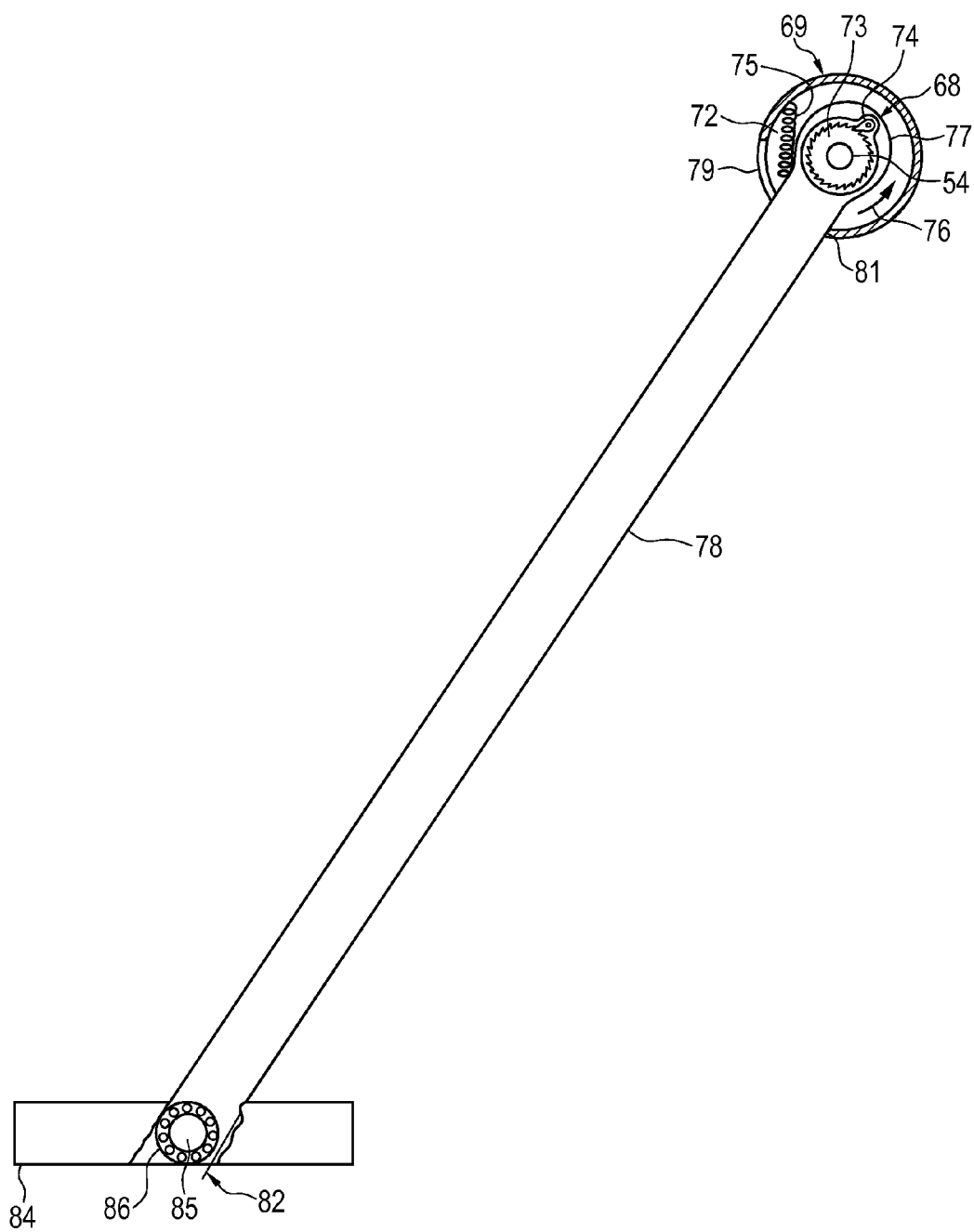
FIG. 3 is a sectional, side elevation view along lines 3-3 of FIG. 2 showing a side view of an elongate member connected to a ratchet mechanism.

In operation and referring to FIGS. 1 and 3, when a rider transmits a downward force on a pedal from the perspective of the Figures, this causes an elongate member 78.1 in the upper position 88 to move through the slot 79 towards the lower position 87. During this process, the pawl 74 engages the ratchet gear 73, and thereby causes the second drive mechanism 46 to rotate via the drive axle 54. The coil spring 75 increases in tension until it effectively acts a mechanical stop by inhibiting the elongate member from rotating past the lower position 87. Alternatively, the slot end 81 shown in FIG. 3 can act as the mechanical stop.

Referring to FIG. 2, the rotation of the drive axle 54 is transmitted to the drive sprocket 58 which in turn causes movement of coupling member 50. Referring to FIG. 1, the coupling member 50 engages the first drive mechanism 40 via the rear sprocket 39 and causes the rear axle 41 and thus the rear wheel 38 to rotate thereby. As a result, the bicycle 10 is propelled forward.

As the rider reduces the downward force applied to the pedal, the coil spring 75 becomes less tensioned and thereby causes the elongate member to return upwards to the upper position 88. The process may then be repeated.

Because the elongate members 78 and 78.1 are positioned high and rearward of the frame, in this example spaced-apart rearward from the seat post 26 and above the rear wheel 38, the elongate members 78 and 78.1 are substantially longer than the cranks are a conventional bicycle and those levers of the prior art. This structure thereby provides the significant advantage of a propulsion assembly that allows a rider to apply far more torque to the rear wheel than in a conventional bicycle or the prior art.

The further the distal end 49 of the support member 48 extends from the seat tube, the longer the elongate members can be and thus the greater the torque can be applied against the elongate members for propelling the bicycle forward.

The structure of the present invention provides the additional advantage of enabling a disabled or handicapped person to use a bicycle. This is in part because only up and down motion is required to propel the bicycle forward. The elongate members are adapted such that less force is required by the rider and kinetic movement is less onerous compared to the rotatary motion required of a rider's feet when riding a conventional bicycle. Moreover, the bicycle of the present invention enables a rider to only use one of the elongate members for propelling the bicycle, which is particularly advantageous if, for example, the rider is a leg amputee.

Figure 4:
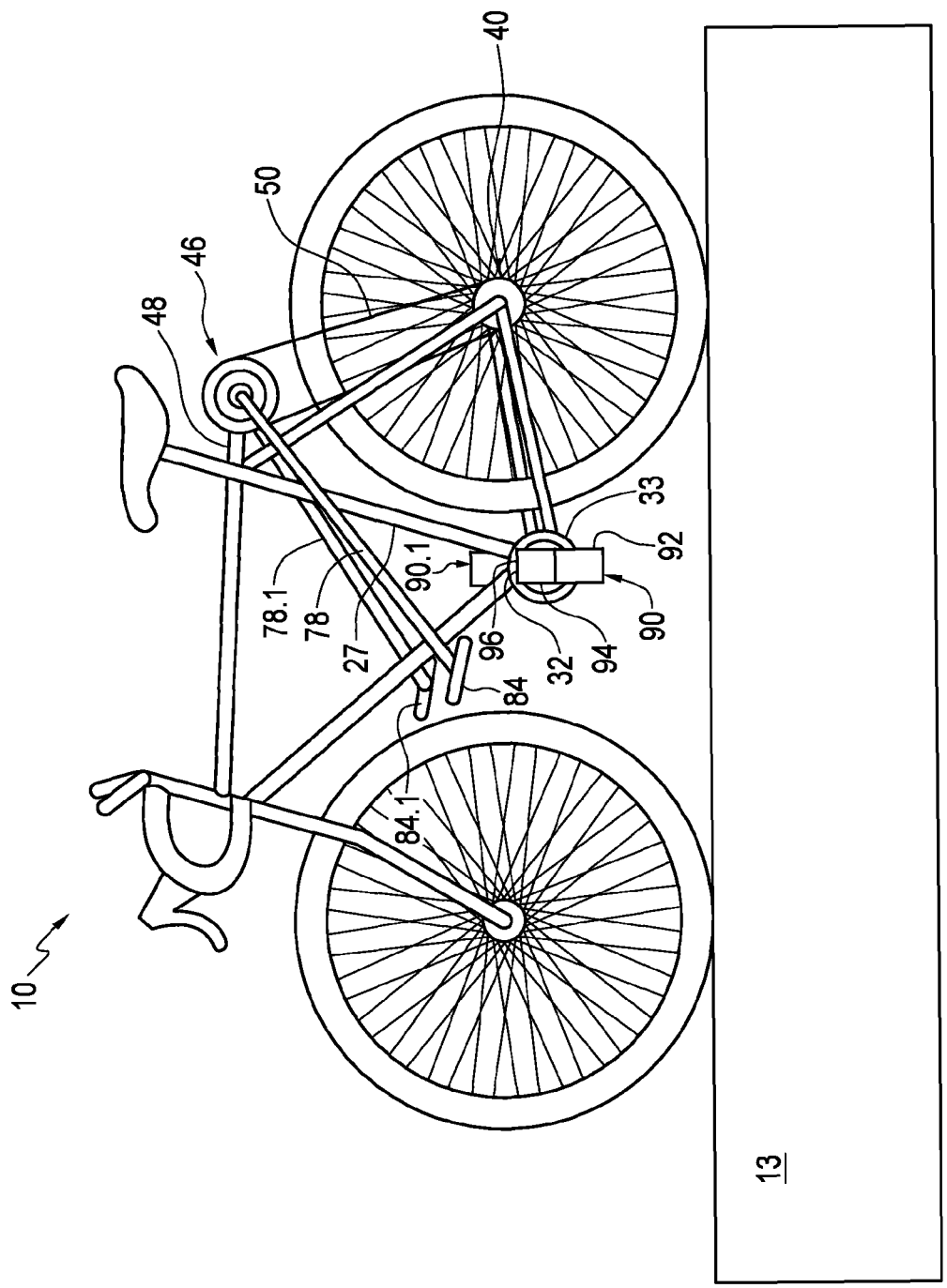
FIG. 4 is a side elevation view similar to FIG. 1 of another embodiment of the present invention.

Another embodiment of the invention is illustrated in FIG. 4. The bicycle shown in FIG. 4 is substantially the same as that of FIGS. 1 to 3, with the exception that instead of resilient members, a first piston 90 and a second piston 90.1 are employed for engaging with the first elongate member and the second elongate member, respectively. In this example the pistons 90 and 90.1 are air pistons. Each of the pistons is substantially the same with the first piston 90 being a mirror-image of the second piston 90.1. Accordingly, only the first piston 90 is described in detail herein with the understanding that the second piston 90.1 has a similar structure and function. For the second piston 90.1 like parts have been given like reference numerals as the first piston with the additional designation "0.1".

The first piston 90 in this example is mounted onto the bicycle 10 at the lower end 32 of the seat tube 27 at the bottom of the frame where typically a front sprocket 33 of a conventional bicycle is located though not required. The first piston 90 includes a cylinder 92 with a piston rod 94 resiliently received therein. The details of how pistons work will not be discussed in great detail as pistons are known to those skilled in the bicycle art. The piston rod 94 has an outer end 96 positioned for engaging with the pedal 84.

In operation, when the elongate member 78 is forced downwards by the rider from the perspective of FIG. 4, it abuts the piston rod 94 at end 96. The piston rod 94 resiliently compresses to a point where the elongate member 78 is now in the lower position. Motion is thereby transmitted to the second drive mechanism through to the first drive mechanism for propelling the bicycle. The piston rod 94 acts as a stop to inhibit the elongate member 78 from moving further downward. As the rider reduces the downward force on the pedal 84, the piston rod 94 resiliently expands and springs the elongate member 78 back upwards to the upper position 88.

Those skilled in the art will appreciate that the elongate members can be configured for providing reciprocal motion: when the first elongate member is in the lower position, the second elongate member is be in the upper position and vice versa, and when the first elongate members is pushed down upon, the second elongate member is elevated upwards.

The coupling member could equally be a belt or cable and the sprockets pulleys. Those skilled in the art will appreciate that a mounting plate is not required for the second drive mechanism. For example, the drive sprocket can be directly connected to the drive axle.

Those skilled in the art will appreciate that this invention can easily be modified to make possible human powered cars and human powered, ultra light aircraft.

The location of the pistons 90 and 90.1 need not be mounted by the front sprocket 33 of a conventional bicycle. For example, the pistons 90 and 90.1 can be mounted anywhere along the pair of seat stays 42, the pair of chain stays 44, or the seat tube 27.

The pistons 90 and 90.1 and the resilient members can be used in conjunction with each other for returning the elongate members back to the upper position.

Instead of using resilient members or pistons, the means for returning the elongate members can be in form of looped bicycle straps attached to the pedals. In order to raise an elongate member back to the upper position, the upper part of the rider's foot can engage the strap and transmit an upward force against the strap to thereby raise the elongate member. These straps are known in the art and therefore will be described in further detail. In such an embodiment, a mechanical stop such as a knob may also be attached, to the frame or for example within the ratchet mechanism, to ensure that the elongate members do not extend past the lower position.

It will further be understood by a person skilled in the art that many of the details provided above are by way of example only and can be varied or deleted without departing from the scope of the invention as set out in the following claims.

What is claimed:

1. A propulsion assembly for a bicycle having a frame with a top having a seat post with seat extending therefrom, a bottom opposite the top, a front with a front wheel rotatably connected thereto at the bottom, and a rear opposite the front with a rear wheel rotatably connected thereto at the bottom, the assembly comprising:

a support member extending from the frame, away from the seat post and towards the rear of the frame, to a distal end of the support member, the distal end being spaced-apart from the rear wheel and comprising a support housing;

a rear axle axially connected to the rear wheel and rotatably mounted on the frame, a rear sprocket radially extending from the rear axle at one end of the rear axle, the rear sprocket being axially connected to the rear wheel for transmitting motion thereto;

a drive axle rotatably received in part within the support housing, a rotatable drive sprocket radially extending from the drive axle at one end of the drive axle, the drive sprocket being spaced-apart from the seat post, the drive sprocket having an axis of rotation;

an endless chain operatively connecting the rear sprocket to the drive sprocket;

a pair of ratchets connected by opposed ends of the drive axle and axially aligning with the axis of rotation of the drive sprocket, the drive sprocket being between the pair of ratchets;

a pair of rigid elongate members operatively connected to the drive sprocket and extending from the pair of ratchets in planes parallel with the frame to a pair of pedals positioned between the rear wheel and the front wheel of the bicycle, the pair of pedals being movable in the planes from an upper position to a lower position for transmitting one-way rotational power to the drive sprocket; and means for selectively returning the pair of rigid elongate members from the lower position to the upper position, the means for selectively returning the pair of elongate members from the lower position to the upper position including a first piston and a second piston, the first piston being operatively connected to the frame, the first piston engaging one of the pair of elongate members in the lower position and being compressed thereby, and the second piston being operatively connected to the frame, the second piston engaging another of the pair of elongate members in the lower position and being compressed thereby, whereby upon being engaged, the first piston and the second piston are retractable and biased towards the upper position for returning the pair of elongate members to the upper position thereby.

2. In combination, a bicycle and a propulsion assembly therefor, the bicycle having a frame with a top having a seat post with seat extending therefrom, the frame including an upper member extending along the top of the frame, the upper member being connected at a junction to the seat post, the frame including a bottom opposite the top, the frame including a front with a front wheel rotatably connected thereto at the bottom, and the frame including a rear opposite the front with a rear wheel rotatably connected thereto at the bottom, the assembly comprising:

a support member axially aligning with the upper member of the frame, the support member extending from the junction, away from the seat post and towards the rear of the frame, to a distal end of the support member, the distal end being spaced-apart from the rear wheel and comprising a support housing;

a rear axle axially connected to the rear wheel and rotatably mounted on the frame, a rear sprocket radially extending from the rear axle at one end of the rear axle, the rear sprocket being axially connected to the rear wheel for transmitting motion thereto;

a drive axle rotatably received in part within the support housing, a rotatable drive sprocket radially extending from the drive axle at one end of the drive axle, the drive sprocket being spaced-apart from the seat post, the drive sprocket having an axis of rotation;

an endless chain operatively connecting the rear sprocket to the drive sprocket;

a pair of ratchets connected by opposed ends of the drive axle and axially aligning with the axis of rotation of the drive sprocket, the drive sprocket being between the pair of ratchets;

a pair of rigid elongate members operatively connected to the drive sprocket and extending from the pair of ratchets in planes parallel with the frame to a pair of pedals positioned between the rear wheel and the front wheel of the bicycle, the pair of pedals being movable in the planes from an upper position to a lower position for transmitting one-way rotational power to the drive sprocket; and means for selectively returning the pair of rigid elongate members from the lower position to the upper position.

* * * * *